(12) United States Patent
Bell

(10) Patent No.: US 7,130,388 B1
(45) Date of Patent: Oct. 31, 2006

(54) PORTABLE MESSAGE WAITING INDICATOR

(75) Inventor: Ian Andrew Bell, Burnaby (CA)

(73) Assignee: America Online, Inc., Dultes, VA (US)

( * ) Notice: Subject to any disclaimer, the term of this patent is extended or adjusted under 35 U.S.C. 154(b) by 113 days.

(21) Appl. No.: 09/759,116

(22) Filed: Jan. 11, 2001

(51) Int. Cl.
*H04M 1/64* (2006.01)

(52) U.S. Cl. .................. 379/88.12; 370/352; 455/455; 455/516; 455/63.1

(58) Field of Classification Search ............. 379/88.12, 379/88.13, 88.15, 88.04, 88.11, 88.17, 211.03; 455/413
See application file for complete search history.

(56) References Cited

U.S. PATENT DOCUMENTS

| | | | |
|---|---|---|---|
| 5,363,431 A * | 11/1994 | Schull et al. ............. | 379/88.12 |
| 5,588,038 A * | 12/1996 | Snyder ........................ | 340/7.1 |
| 5,838,226 A * | 11/1998 | Houggy et al. ......... | 340/310.01 |
| 5,918,158 A * | 6/1999 | LaPorta et al. ............. | 340/7.29 |
| 5,939,699 A * | 8/1999 | Perttunen et al. ....... | 235/462.01 |
| 5,987,317 A * | 11/1999 | Venturini .................. | 455/412.2 |
| 6,014,559 A * | 1/2000 | Amin ......................... | 455/413 |
| 6,192,251 B1 * | 2/2001 | Jyogataki et al. ........... | 455/466 |
| 6,201,858 B1 * | 3/2001 | Sundhar ................... | 379/88.12 |
| 6,313,733 B1 * | 11/2001 | Kyte .......................... | 340/7.22 |
| 6,317,485 B1 * | 11/2001 | Homan et al. ........... | 379/88.12 |
| 6,389,115 B1 * | 5/2002 | Swistock .................. | 379/88.12 |
| 6,418,305 B1 * | 7/2002 | Neustein ..................... | 455/406 |
| 6,418,307 B1 * | 7/2002 | Amin ......................... | 455/413 |
| 6,556,666 B1 * | 4/2003 | Beyda et al. ............. | 379/88.12 |
| 6,560,318 B1 * | 5/2003 | Spielman et al. ........ | 379/88.12 |
| 6,574,470 B1 * | 6/2003 | Chow et al. ................ | 455/417 |
| 6,630,883 B1 * | 10/2003 | Amin et al. ............... | 340/7.29 |

* cited by examiner

*Primary Examiner*—Gerald Gauthier
(74) *Attorney, Agent, or Firm*—Michael A. Glenn; Glenn Patent Group

(57) ABSTRACT

An apparatus and method are provided for easily indicating to a user that a communication has been received for him or her. A portable message waiting indication device (MWID) includes a power source (e.g., battery), signal receiver and a visual and/or audible indicator. The indicator is activated in response to receipt of a first wireless signal at the receiver. In response to a second signal the indicator is deactivated. A MWID may also include a user-actuable switch or sensor to deactivate the indicator. In one method of using a MWID to inform a user that a communication has been received, the user registers the MWID and may identify when the MWID indicator should be activated (e.g., for certain types of messages (e.g., voice-mail, electronic mail), certain senders, a category of senders, time of day, message priority). Multiple MWIDs may be configured and employed by a user, and each may be configured similarly or differently.

25 Claims, 3 Drawing Sheets

PORTABLE MESSAGE WAITING INDICATOR

BACKGROUND

This invention relates to the field of communications. More particularly, an apparatus and methods are provided for indicating the receipt of a communication.

Various devices and methods have been introduced for the purpose of notifying a person that a telephonic message has been received for him or her. Answering machines, for example, typically indicate the receipt of a message by flashing a light and/or displaying the number of messages.

The advent of network-based voice-mail service has made it somewhat more difficult to provide an easy, simple and fast way to notify a person that he or she has received a message. With network-based voice-mail service, the person's messages are stored in a remote location operated by the provider of the voice-mail service (e.g., the person's local telephone company). Unlike with an answering machine, with network-based voice-mail service there are no means of quickly (e.g., visually) alerting a person to the receipt of a message. Typically the person must take his or her telephone off-hook to test for a stutter-tone that indicates receipt of a message.

This requires proactive effort by a person, in contrast to simply looking at a visual indicator, is not as easy, and may not be possible at all times. In particular, because the person must physically access a telephone he or she cannot test for stutter-tone when traveling or otherwise away from the telephone.

Another problem with many existing systems for indicating message-waiting status is that they do not function if a person's telephone line is in use. A person cannot test his telephone line for stutter-tone while using it to talk to someone, access the Internet, etc.

Further, stutter-tone is line-specific in that from one telephone a person can only check for messages waiting in a voice-mail system for that telephone line. While at work, a person cannot check for messages received by her residential telephone service, and vice versa.

Many message waiting indication systems are thus dependent upon or tied to calls to or from a particular telephone line, place (e.g., residence, office) and/or device (e.g., a specific telephone). As a result, indicating receipt of a message for a user of a central (e.g., network-based) voice-mail service generally requires the user to adopt new behavior and/or pay extra money for specialized notification services or systems.

Even the user of pager notifications to alert someone that he or she has received a voice-mail message has disadvantages. For example, a paging system may require manual deactivation, in that the person may be required to take some action (e.g., save or delete the message) in order to avoid being paged multiple times for a single message. Further, in order for a pager to inform a person of messages on more than one telephone line or at multiple locations, the pager or pager service must be configured separately for each line or location.

Therefore, what is needed is an apparatus and method of notifying someone of the receipt of a voice-mail message for him or her. The apparatus should be portable, easy to use and should not be limited to use at just one location or with just one telephone or telephone line. The apparatus should be configurable in as few steps (e.g., one) as possible, and it may be desirable for the apparatus to be automatically deactivated when a message is retrieved.

SUMMARY

In one embodiment of the invention an apparatus and methods are provided for notifying a person that he or she has received a communication, regardless of whether the person is using his or her telephone line. In this embodiment the device is designed for simple operation to readily indicate a message-waiting status, and provides independence from any particular place or telephone line. In addition, multiple devices may be employed to indicate message-waiting status for one line or one device may be used to indicate message-waiting status for multiple lines.

In a present embodiment a user employs a message waiting indication device (MWID) to determine when he or she has received a communication (e.g., a telephone call, an electronic mail message, a facsimile). In this embodiment a MWID includes a power source (e.g., a battery), a receiver for receiving notification of a communication and an indicator such as an LED (Light Emitting Diode) or audible alarm. When a communication is received for the user, a first signal is sent to the MWID and the indicator is activated. Receipt of a second signal may turn the indicator off. The small size, light weight, unobtrusive nature and low power requirements of the device make it portable and easy to keep with a person when a larger device (e.g., a telephone) would be awkward.

In another embodiment of the invention a MWID may include means (e.g., a button or pad) for turning the indicator off.

In one method of using a MWID, a user registers the device with his or her voice-mail service or other organization charged with providing him or her with notification of communications. In this method a MWID is assigned a unique code (e.g., serial number), which may be stamped or printed on the device. The user may register more than one device for a specific telephone line (e.g., home or office), electronic mail account, purpose (e.g., indicate receipt of a telephone call, electronic mail message, facsimile) or one device for multiple telephone lines, purposes, etc. A user's message waiting indication service may be configured to indicate receipt of a communication from all sources (e.g., all telephone calls), a specific source (e.g., an electronic mail message from a specific sender) or from multiple sources (e.g., all calls received from a specific area code).

When a user receives a communication meeting the criteria for which a MWID is configured, a signal is sent to the MWID and its indicator is activated. The user may deactivate the indicator manually if the MWID is so designed, and/or a second signal may be sent to the MWID to deactivate it when the user accesses retrieves the communication. In one embodiment of the invention an "empty" or "true" signal is sent to a MWID to activate its indicator, while a "not empty" or "false" signal is sent to deactivate it.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed may incorporate a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, a method described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a message-indicating device or message waiting indication device (MWID) is provided to indicate to a user that he or she has received a communication. The communication may be a voice-mail message, an electronic mail message, or any other type of communication. In this embodiment the MWID is small, lightweight, unobtrusive and simple to use. It includes an indicator that, when activated (e.g., by a wireless paging signal), informs the user of the communication. The indicator may provide a visual and/or an audible alert, and may be an LED (Light Emitting Diode) or other suitable element.

The MWID also includes a power source (e.g., a battery), which may or may not be replaceable. Therefore, a MWID may be disposable. A MWID may include a user-operable switch, button or sensor to deactivate the indicator. The indicator may also, however, be deactivated in response to receipt of a second signal that is different from the signal that activates the indicator. Thus, after the user accesses or acknowledges receipt of the communication, the second signal may be sent to deactivate the indicator.

Figure 1:
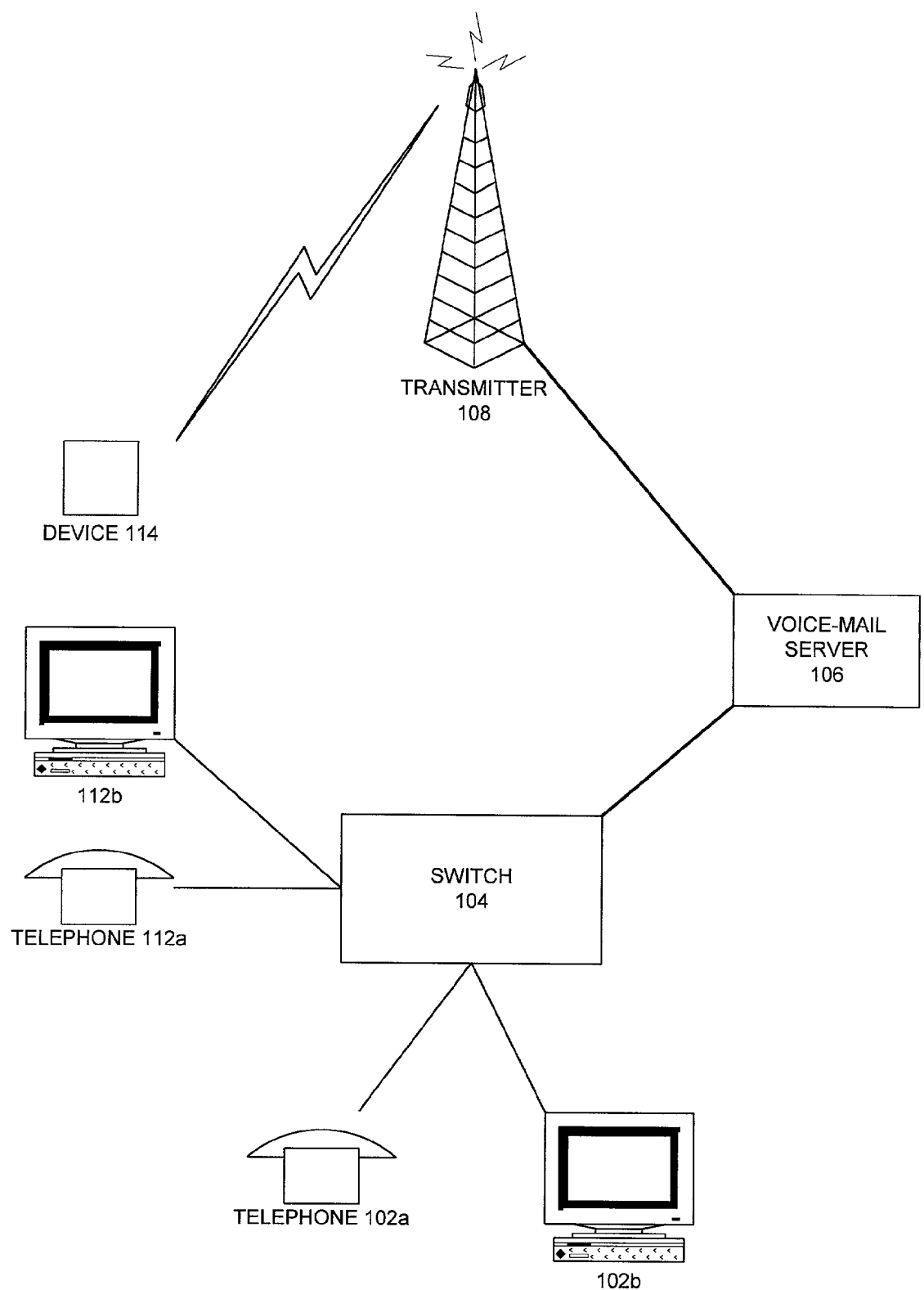
FIG. 1 is a block diagram depicting a system for indicating to a user the receipt of a communication in accordance with an embodiment of the present invention.

FIG. 1 depicts one system in which a MWID may be employed to notify a user of a voice-mail message, according to one embodiment of the invention. In FIG. 1, a telephone call is initiated to a user from one of communication devices 102a, 102b. Telephone 102a may be wired or wireless telephone, and computer 102b may be a desktop, laptop, hand-held or other type of computer. Although the system of FIG. 1 is described in the context of a voice-mail message, in other embodiments of the invention different types of communications (e.g., electronic mail, facsimile) and communication devices may be employed.

The telephone call is routed through switch (e.g., a telephone company's central office, an Internet service provider) or gateway 104 to telephone 112a or computer 112b, which are associated with the user. In this example, however, the user is unavailable at the time of the call. He or she may already be using one of the devices for another purpose, may be away or may be otherwise occupied.

Therefore, the call is forwarded or rerouted to voice-mail server 106, which may be part of a central or network voice-mail system. At voice-mail server 106 the caller leaves a voice-mail message, which may be recorded in his or her own voice or may be computer generated (e.g., through computer 102b).

Voice-mail server 106, or a system comprising server 106, then issues a first signal (e.g., a paging signal) to the user's MWID 114. The signal may be sent through transmitter 108 or whatever other signal generation and distribution system is available or appropriate (e.g., wired, satellite). Upon receipt of the signal, the MWID activates an indicator to alert the user that a communication has been received.

In this embodiment of the invention the first signal may be an "empty" paging signal. In other words it may comprise a header but no body. Alternatively, it may include a very short body (e.g., a single character or digit). When the user retrieves, accesses or otherwise acknowledges the communication (e.g., by playing back the voice-mail message), a second signal may be sent to MWID 114. When the second signal is received, the indicator is deactivated. Illustratively, such a second signal is different from the first signal that activated the MWID indicator. Thus, if the first signal is an empty page, the second signal may be a page with a short body (e.g., one character or digit).

In one embodiment of the invention MWID 114 may include a user-operable switch to deactivate the indicator.

Figure 2:
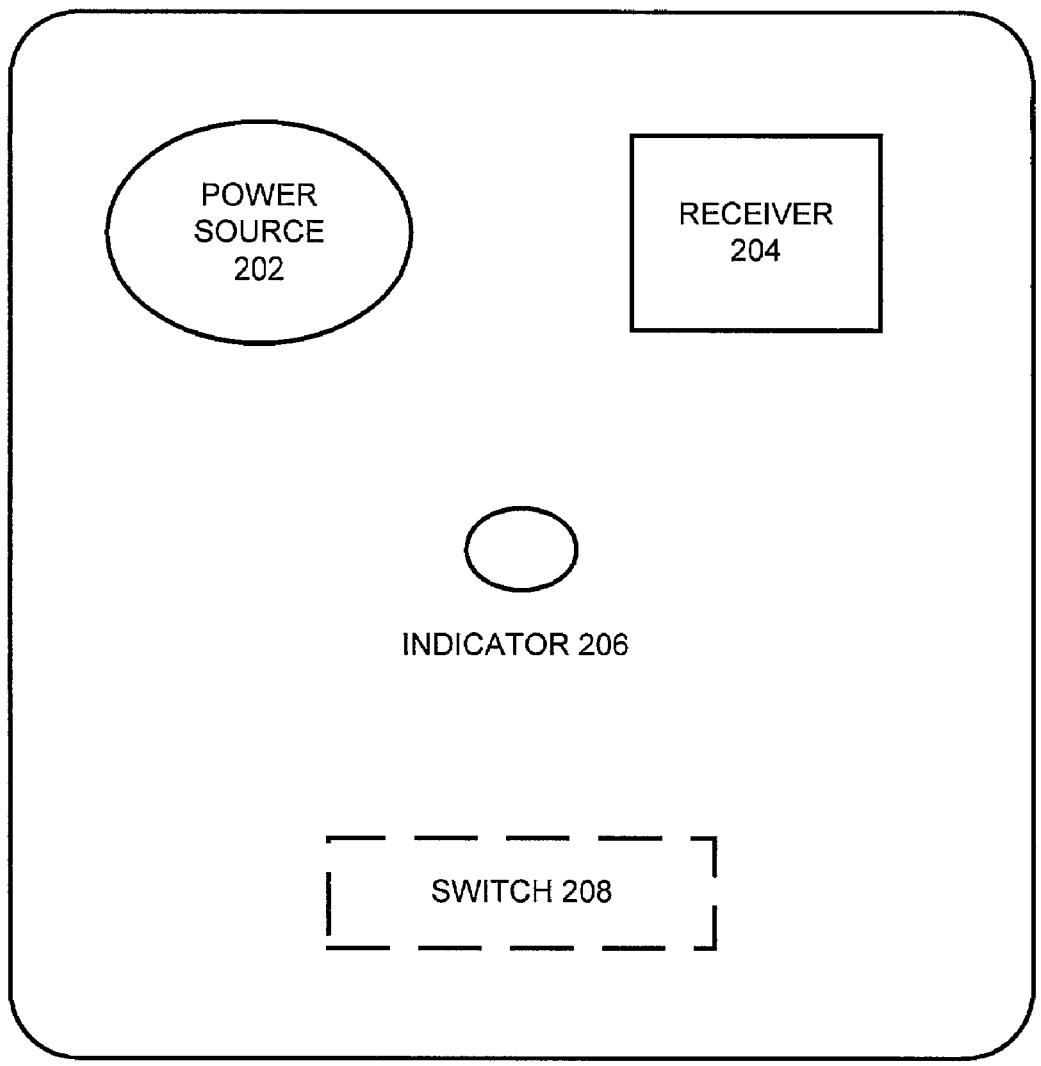
FIG. 2 is a block diagram illustrating a message-waiting indicator in accordance with an embodiment of the invention.

FIG. 2 is a block diagram of a MWID according to a present embodiment of the invention. MWID 200 of FIG. 2 includes power source 202, receiver 204, indicator 206 and, optionally, switch 208. MWID 200 exhibits the shape of a rounded square, but the configuration of a message waiting indication device is not limited to that of MWID 200. In other embodiments of the invention a MWID may assume many different shapes and configurations. In particular, a MWID may be shaped to attach to, appear similar to, or include another object (e.g., a key, a writing implement, a fob).

Power source 202 may be any of various types (e.g., nickel-metal hydride, lithium-ion), sizes and specifications. It is estimated that approximately three volts is sufficient to operate a MWID configured as shown in FIG. 2. As a battery, power source 202 may or may not be replaceable. Also, although not shown in FIG. 2, MWID 200 may include a socket or slot to hold a spare battery. In one alternative embodiment of the invention power source 202 may be a photovoltaic power cell capable of converting light or solar power to electricity to operate the MWID.

Receiver 204 is configured to receive radio (e.g., wireless) signals, as described in conjunction with FIG. 1, to activate and deactivate indicator 206.

Indicator 206 may provide a visual, audible and/or vibratory alert when receiver 204 receives an appropriate signal. Thus, indicator 206 may comprise an LED, LCD (Liquid Crystal Diode), speaker or other such element. Indicator 206 may be capable of one or more alert types. For example, a user may configure a MWID (e.g., through a registration process as described below) so that its indicator flashes with one interval or pattern in one situation and a different interval or pattern in a second situation. Thus, the number of consecutive flashes may indicate a number of communications, a communication priority, a telephone line on which a voice-mail message was left, a type of communication (e.g., voice-mail, electronic mail), etc.

In one alternative embodiment of the invention, multiple indicators may be included on a MWID to indicate receipt of different types of communications, receipt of a message at a different location (e.g., residence, office, mobile telephone), different priorities of messages, etc.

Switch 208, if included in a MWID, allows a user to manually deactivate indicator 206 after it is activated. In one embodiment of the invention indicator 206 may incorporate switch 208. Thus, a user may wish to deactivate the indicator after it alerts him or her to a communication, without having to first access the communication. As described above, a specific signal may be sent to a user's MWID to deactivate its indicator after the user accesses his waiting communication(s).

In an embodiment of the invention in which the device adopts the rounded square shape of FIG. 2, the dimensions of MWID 200 may be approximately 0.5" long by 0.5" wide by 0.3" thick. Further, the MWID may include a hole or other means of attaching to a key chain or other organizer. Yet further, the MWID may have a serial number or other identification code printed on it.

The portable nature of the device makes it very easy to use without being obtrusive, and it can even be disposable. A MWID may include a hole, hook, adhesive or other means of being attached to something. Thus, MWIDs could be attached to key chains, computer systems, telephone equipment, car dashboards, and other locations from which a user can be easily and quickly notified that a communication is awaiting him or her. Illustratively, adhesive (e.g., regular or double-backed tape, non-permanent glue) may be placed on the back of the MWID to allow for easy and/or removable attachment to a wall, telephone, other device, furniture, etc.

Figure 3:
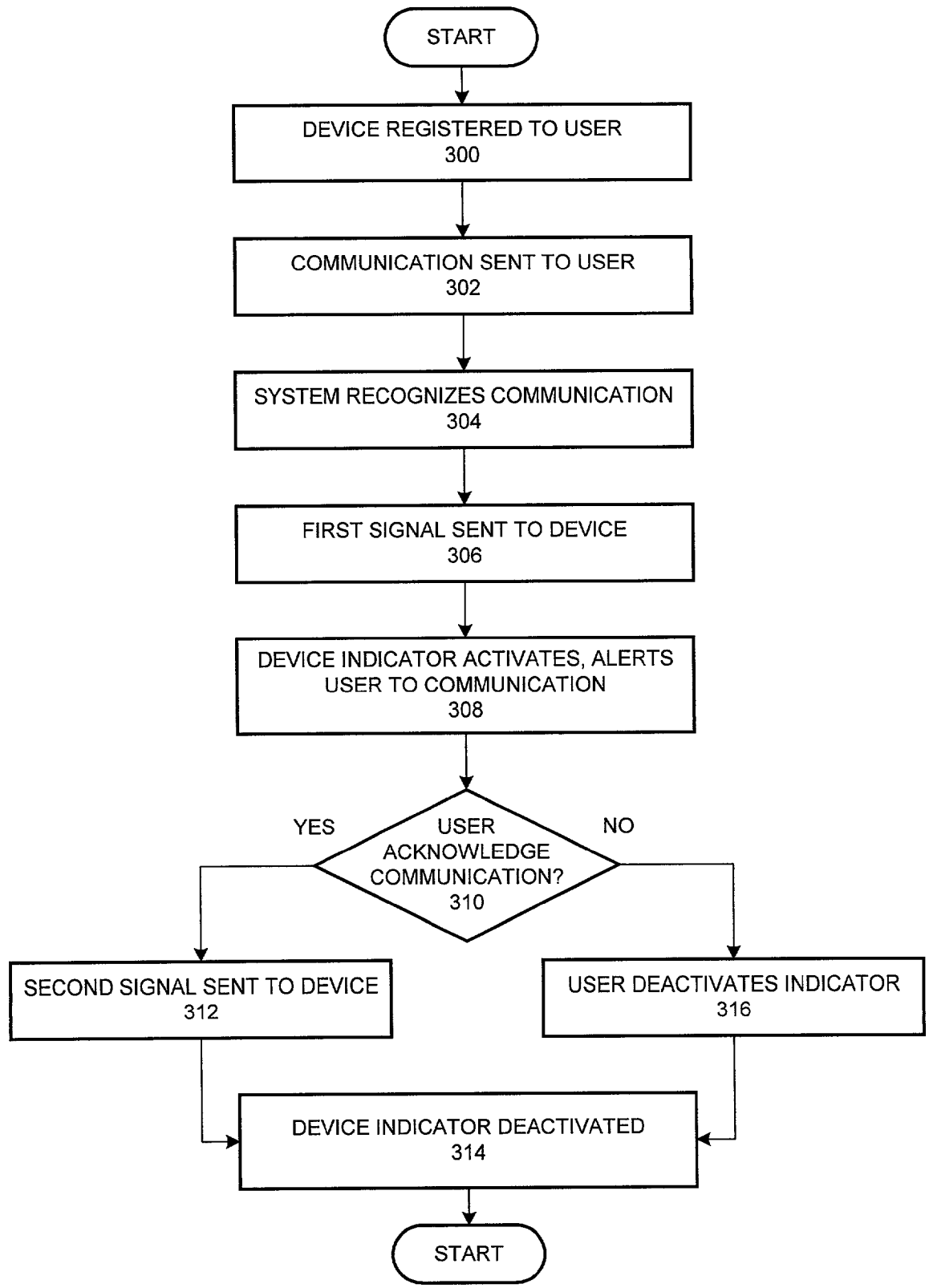
FIG. 3 is a flowchart illustrating one method of employing the message-waiting indicator of FIG. 2 in accordance with an embodiment of the invention.

FIG. 3 demonstrates one method of notifying a user of a communication with a message waiting indication device such as MWID 200 of FIG. 2. Other methods of employing a MWID may be derived from FIG. 3 and the accompanying discussion.

In state 300 of FIG. 3, a user registers a MWID. The MWID may, for example, be provided by the organization providing voice-mail service or an Internet service to the user. The user may, upon receipt of the MWID, access a web site of the organization to register and configure the MWID or may do so telephonically.

Illustratively, registration of a MWID may entail associating the MWID (e.g., by serial number) with the user and indicating when it should be activated. Thus, the user may indicate that he or she wishes to register the device for use with a certain telephone number (e.g., for voice-mail messages left for the user at that number) or multiple telephone numbers. Thus, one MWID may be employed to indicate receipt of a voice-mail message at any of several telephone numbers. Conversely, multiple MWIDs may be associated with a single telephone number, in which case each may be configured differently or they may be configured identically.

The user may specify that he or she is to be alerted (i.e., the MWID activated) for every voice-mail message left for him or her, for every message from a particular person, telephone number or collection of telephone numbers. The user may specify that he or she is only to be alerted for certain types (e.g., voice-mail messages, electronic mail messages), lengths or priorities of messages, etc. In summary, each MWID may be registered and configured separately to alert a user to different communication statuses. Users may also be able to de-register a MWID.

If the user's MWID is capable of multiple indication patterns (e.g., different LED flashing intervals or sequences), the user may also specify which pattern is to be used for different types of communications, different communication priorities, different numbers of communications and other criteria.

In state 302 a communication is sent to the user. The communication may be a voice-mail message, an electronic mail message, a facsimile, a page, etc.

In state 304, the organization tasked with managing notifications to the user via his or her MWID recognizes that the communication is waiting. Illustratively, this organization may also operate the system on which the communication was received, in which case states 302 and 304 may be performed substantially simultaneously. Otherwise, the organization is notified of the communication or checks the user's voice-mail box or electronic mail box or other communication repository on a periodic basis to determine if any communications await the user's attention.

In state 306, the organization initiates a first signal to the user's MWID. Illustratively, this may simply comprise an empty paging signal or other simple wireless signal.

In response to the first signal, in state 308 an indicator on or in the user's MWID alerts the user that he or she has one or more communications waiting. The manner in which the indicator flashes, beeps, vibrates or otherwise signals the user may indicate the type, source, size, number, priority or other characteristic of the communication.

If, in state 310, the user retrieves his or her communication(s), then in state 312 a second signal, possibly different from the first signal, is sent to the MWID. In response to this, in state 314 the MWID indicator is deactivated.

Otherwise, in one embodiment of the invention, in state 316 the user may manually deactivate the MWID indicator. This may be done, for example, by manipulating a sensor, switch, button or other portion of the MWID provided for this purpose. As with the second signal, manipulation of such a switch will cause the indicator to be deactivated in state 314.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

For example, the wireless signals used to activate and deactivate a message waiting indication device (MWID) in an embodiment of the invention may be of various types or within various frequency bands. In one implementation radio paging may be employed, in which case the receiver included in the MWID is a radio-paging receiver. In this implementation, one radio paging signal or ping could be used to activate the MWID indicator, while a second signal, or two successive pings, could deactivate the indicator. This implementation may be particularly well suited for an environment in which an inexpensive device is desired that can operate on the power provided by a small battery. Further, signaling such a device requires little network utilization, thus keeping the cost of each signaling event low.

What is claimed is:

1. A method of indicating receipt of a communication, comprising:

registering a first message-indicating device for a user, said first device comprising an indicator;

registering a second message-indicating device for said user, said second device comprising an alarm;

registering said second message-indicating device for activation in response to receipt of one of multiple types of communications;

receiving notification of receipt of a first communication directed to a communication device associated with the user;

initiating a first wireless signal to said first message-indicating device;

initiating said first wireless signal to said second message-indicating device;

wherein in response to said first signal, said indicator of said first device and said alarm of said second device activate to alert the user;

wherein said first message-indicating device and said communication device are separate devices; and deactivating said indicator upon acknowledgement of said receipt of said communication by said user.

2. The method of claim 1, further comprising:

initiating a second wireless signal to said first message-indicating device;

wherein in response to said second signal said indicator deactivates.

3. The method of claim 2, wherein said second wireless signal is initiated after the user accesses said first communication.

4. The method of claim 1, wherein said indicator deactivates in response to manipulation of the first message-indicating device by the user.

5. The method of claim 1, wherein said registering comprises:

receiving an identification code of said first message-indicating device from the user; and associating said identification code with one or more types of communications.

6. The method of claim 5, wherein said first communication is a voice-mail message.

7. The method of claim 5, wherein said first communication is an electronic mail message.

8. The method of claim 1, further comprising:

initiating said first signal to said second device when said first signal is initiated to said first device.

9. The method of claim 1, further comprising:

initiating said first signal to said second device when notification of receipt of a second communication directed to the user is received, but not when said notification of said first communication is received.

10. A method of using a message-waiting device to notify a user of receipt of a communication for the user, the method comprising:

receiving a communication directed to a communication device associated with said user;

registering a second message-indicating device for activation in response to receipt of one of multiple types of communications;

initiating a first electronic signal to a first message-waiting device associated with the user, wherein said first message-waiting device includes an indicator and said first electronic signal is configured to activate said indicator;

initiating said first electronic signal to a second message-waiting device associated with the user, wherein said second message-waiting device includes an alarm and said first electronic signal is configured to activate said alarm;

providing said communication to said user; and after said providing, automatically initiating a second electronic signal to said first message-waiting device, wherein said second electronic signal is configured to deactivate said indicator upon acknowledgement of said receipt of said communication by said user;

wherein said first message-waiting device and said communication device are separate devices.

11. A method of indicating receipt of a communication, comprising:

receiving a first wireless signal at a first message-indicating device, wherein said first device includes a first alarm;

receiving said first wireless signal at a second message-indicating device immediately after said receipt of said first wireless signal at said first device, wherein said second device includes a second alarm;

registering said second message-indicating device for activation in response to receipt of one of multiple types of communications;

activating said first alarm and said second alarm in response to said first wireless signal; and deactivating said first alarm upon acknowledgement of said receipt of said communication by said user;

wherein receipt of said first wireless signal indicates that a first communication was directed to a communication device associated with a user of said first device; and wherein said first message-indicating device and said communication device are separate devices.

12. The method of claim 11, wherein deactivating said first alarm comprises deactivating said first alarm in response to a second wireless signal.

13. The method of claim 12, wherein said second signal is received after the user accesses said first communication.

14. The method of claim 11, wherein deactivating said first alarm comprises deactivating said first alarm in response to manipulation of the first device by the user.

15. The method of claim 11, further comprising registering said first device for activation in response to receipt of one of multiple types of communications including said first communication.

16. A computer readable storage medium storing instructions that, when executed by a computer, cause the computer to perform a method of indicating receipt of a communication, the method comprising:

registering a first message-indicating device for a user, said first device comprising an indicator;

registering a second message-indicating device for said user, said second device comprising an alarm;

registering said second message-indicating device for activation in response to receipt of one of multiple types of communications;

receiving notification of receipt of a first communication directed to a communication device associated with the user;

initiating a first wireless signal to said first message-indicating device;

initiating said first wireless signal to said second message-indicating device;

wherein in response to said first signal, said indicator of said first device and said alarm of said second device activate to alert the user;

wherein said first message-indicating device and said communication device are separate devices; and deactivating said indicator upon acknowledgement of said receipt of said communication by said user.

17. A portable apparatus for indicating receipt of a communication, comprising:
- a first message-indicating device further comprising a signal receiver configured to receive a first wireless signal generated after receipt of a communication directed to a communication device associated with a user and
- an indicator configured to activate in response to receipt of said first signal;
- a second message-indicating device further comprising another signal receiver configured to receive said first wireless signal and an alarm configured to activate in response to receipt of said first signal; and
- registering said second message-indicating device for activation in response to receipt of one of multiple types of communications;
- wherein said indicator is configured to deactivate in response to a second signal upon acknowledgement of said receipt of said communication by said user; and
- wherein said apparatus and said communication device are separate devices.

18. The apparatus of claim 17, wherein said second signal is a wireless signal.

19. The apparatus of claim 17, further comprising a switch configured to issue said second signal in response to user manipulation.

20. The apparatus of claim 19, wherein said indicator comprises said switch.

21. The apparatus of claim 17, wherein said indicator is a visual indicator.

22. The apparatus of claim 17, wherein said indicator is an audible indicator.

23. A communication waiting indication system comprising:
- a first communication waiting indication device associated with a first user, said first device comprising a first alarm;
- a second communication waiting indication device associated with said first user, said second device comprising a second alarm; and
- a notification server configured to issue a first wireless signal toward said first device and said second device in response to receipt of a first communication directed to a communication device associated with the first user;
- wherein in response to said first wireless signal, said second message-indicating device is registered for activation in response to receipt of one of said multiple types of communications;
- wherein in response to said first wireless signal, said first alarm is activated;
- wherein said notification server initiates a second wireless signal toward said first device after the first user acknowledges said first communication and wherein, in response to said second wireless signal, said first alarm is deactivated; and
- wherein said first waiting indication device and said communication device are separate devices.

24. The system of claim 23,
- wherein said second alarm of said second device is also activated in response to said first wireless signal.

25. The system of claim 23,
- wherein said second alarm of said second device is not activated in response to said first wireless signal.

* * * * *